FUSED QUARTZ MOTION SENSITIVE TRANSDUCER

Filed June 23, 1966 2 Sheets-Sheet 1

INVENTOR.
WILLARD E. BUCK
BY
Anderson, Spangler & Wymore
ATTORNEYS

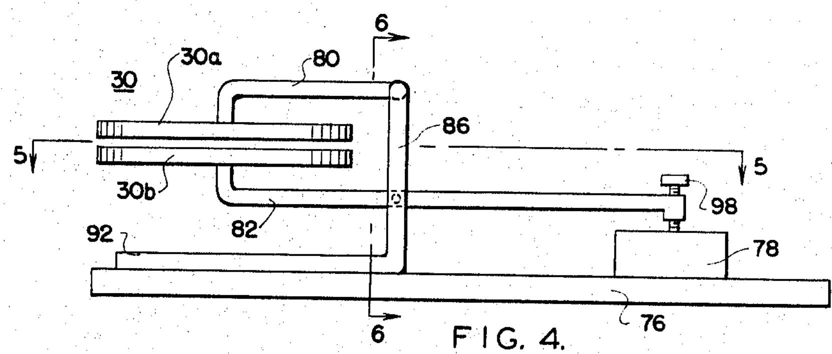
FIG. 4.
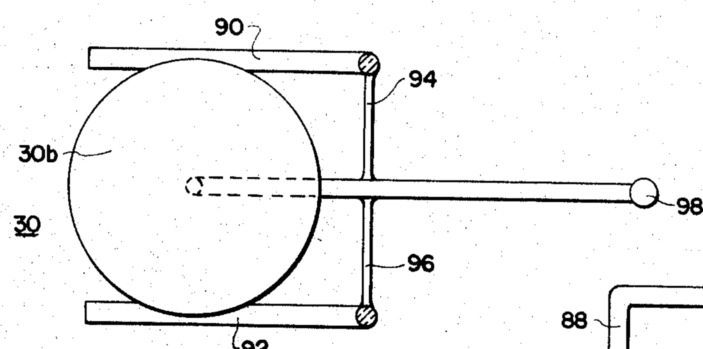
FIG. 5.
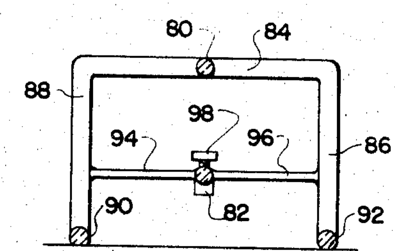
FIG. 6.
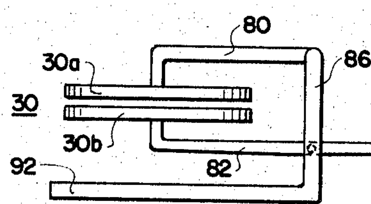
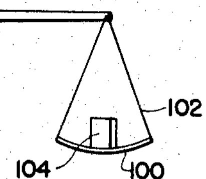
FIG. 7.
30a 106 30 30b 108 110 112
FIG. 8.
INVENTOR.
WILLARD E. BUCK
BY
Anderson, Luedeka, Fitch & Wymore
ATTORNEYS United States Patent Office 3,356,963
Patented Dec. 5, 1967

3,356,963
FUSED QUARTZ MOTION SENSITIVE TRANSDUCER

Willard E. Buck, P.O. Box 418, Saratoga, Calif. 95070

Filed June 23, 1966, Ser. No. 559,786
7 Claims. (Cl. 331—65)

ABSTRACT OF THE DISCLOSURE

Capacitance transducer comprising substantially parallel plates with one plate fixed. The other plate is movable and is supported for movement by a fused quartz structure. The spacing of the plates controls the frequency of an oscillator having the industance coil thereof also supported on fused quartz and the frequency of the oscillator is almost exclusively a function of the spacing of the plates.

The use of variable capacity devices for the measurement of pressure has not been too successful in the past due to their being temperature and/or time sensitive. This has been due in part to the design of the capacitance elements and their support, as well as the associated circuitry. While some compensation can be provided in the design for these unstable conditions, a satisfactory solution has not been found and the attempted solutions are either so complicated or so expensive as to be not practical.

Accordingly, it is an object of the invention to provide improved transducer means of the type described.

It is another object of the invention to provide an improved pressure transducer which is time and temperature stable.

Another object of the invention is to provide an improved pressure transducer with associated circuitry which has the ability to minimize external effects, such as voltage changes, aging of tubes, temperature changes and the like.

A still further object of the invention is to provide a highly stable and accurate pressure transducer which provides an output frequency which is directly related to the measured quantity avoiding the need for intermediate frequency conversion and the attendant problems and expenses.

Other objects and various further features of novelty and invention will be pointed out or will occur to those skilled in the art from a reading of the following specification in conjunction with the accompanying drawings. In said drawings which show, for illustrative purposes only, preferred forms of the invention:

FIGURE 4 is an illustration in elevation of a mechanical motion comparator using the transducer of this invention;

FIGURE 5 is a view along line 5—5 of FIGURE 4;

FIGURE 6 is a view along line 6—6 of FIGURE 4;

FIGURE 7 is an illustration in elevation of a scale using the transducer of this invention; and FIGURE 8 is an illustration in elevation of a temperature measuring device using the transducer of this invention.

The pressure transducer according to the invention is a capacitance transducer which takes the form of substantially parallel capacitor plates with one plate fixed, and the other subject to movement relative to the fixed plate in response to pressure and the like. The pressure capsule of the transducer is made entirely of fused quartz and, in turn, is fused to gold-plated, fused quartz capacitor plates that form the variable in the LC circuit of a stable oscillator. The stable oscillator is balanced to minimize phase shift and external effects. The frequency of the oscillator is determined almost exclusively by the resonant circuit and is free of such effects as aging of components and small changes in place and filament currents. The oscillator is lightly coupled to the resonant LC circuit as by tapping only a few turns in the center of the coil keeping loading down and "Q" of the circuit high. Use is made of fused quartz for the support of the capacitance and inductance elements since quartz is substantially a perfect elastic and the hysteresis effects are minimized. In like manner, quartz has a low thermal coefficient of expansion. Further, the transparency of quartz to electromagnetic energy contributes to the frequency stability of the oscillator.

Figure 1:
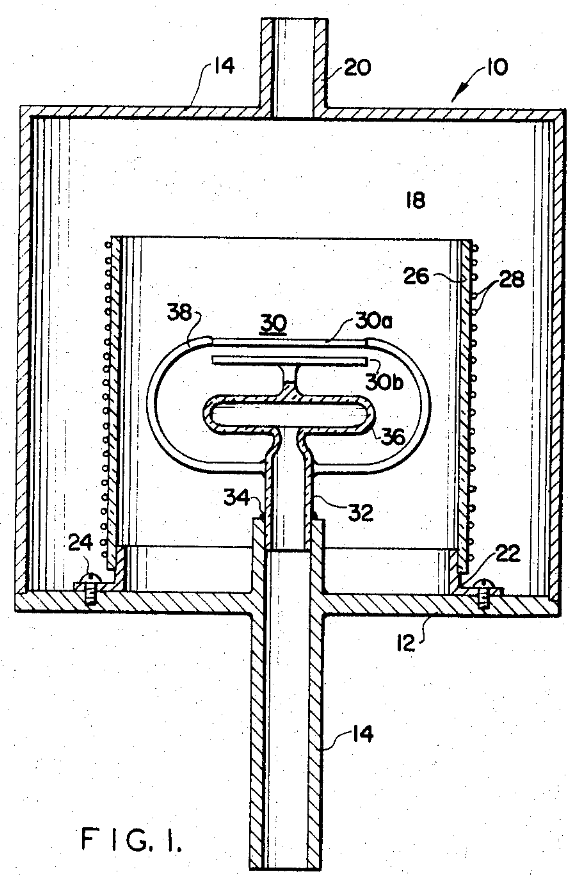
FIGURE 1 is an elevational view, partly in cross section, of the transducer arrangement of the invention.

Referring now to the drawings, and in particular to FIGURE 1, there is shown the pressure capsule 10 of the pressure transducer. The capsule 10 is seen to comprise a circular base 12 having a centrally positioned conduit 14 therethrough. The outer shell of the capsule is completed by a cylindrically shaped cup 16 secured at the open end thereof to the base 12 in pressure-tight relation to define an outer chamber 18. The cup 16 is provided with a centrally positioned conduit 20 through the closed end communicating the exterior with chamber 18. A circular coil mounting ring 22 is positioned on the base 12 to be concentric with conduit 14 and fastened as by screws 24 and the like. A cylindrical coil form 26, preferably of fused quartz, is mounted on mounting ring 22 and secured thereto by gluing or other suitable means. The coil form supports the inductance 28 of the resonant circuit.

The capacitance 30 of the resonant circuit is made up of a fixed capacitor plate **30*a* and a movable plate 30*b*. Plates 30*a* and 30*b* are of gold-plated fused quartz which are fused to supporting members also of fused quartz. A tube 32, preferably of fused quartz, is fastened in sealed relation to conduit 14 as at 34. The upper end of tube 32 has fastened thereto or formed therein a bellows 36 with the interior of the bellows, tube 32 and conduit 14 being sealed from communication with chamber 18. The movable plate 30*b* of capacitor 30 is mounted on bellows with its major dimension normal to the movement of the bellows. A plurality of arms 38, preferably of fused quartz, are secured to tube 32 at points not affected by the expansion of bellows 36. The ends of arms 38 support the fixed plate 30*a* in close parallel relation to plate 30*b*. Suitable leads, not shown, are connected to plates 30*a* and 30*b* and appropriate turns of coil 28. It will be seen that where a pressure differential exists between chamber 18 and the interior of bellows 36 via conduit 14, movement of the bellows will occur resulting in the displacement of plate 30*b* with respect to plate 30*a*** with a change of the capacitance therebetween.

Figure 2:
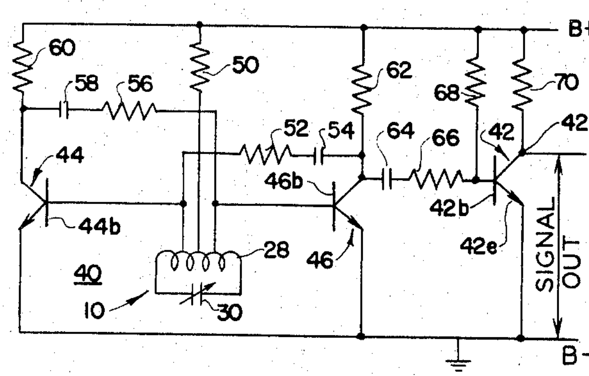
FIGURE 2 is a circuit diagram utilizing transistors including a transducer incorporating the present invention, the transducer being shown schematically.

Referring now to the circuit of FIGURE 2 there is shown a transistor circuit including oscillator 40 and an amplifier stage 42. The oscillator stage includes transistors 44 and 46 connected in push-pull in a grounded emitter configuration. The bases **44*b* and 46*b* of transistors 44 and 46 are connected to a tapped portion of coil 28 to either side of a center tap 48. The bases of transistors are biased via resistor 50 from B+ supply and the tapped portion of coil 28. The base of transistor 44 is cross-coupled to the collector 46*c* of transistor 46 via resistor 52 in series with capacitor 54 and the base of transistor 46 is cross-coupled to the collector 46*c* of transistor 46 via resistor 52 in series with capacitor 54 and the base of transistor 46 is cross-coupled to the collector 44*c* of transistor 44 via resistor 56 in series with capacitor 58. Bias is supplied to the collectors of transistors 44 and 46 from the B+ supply via resistors 60 and 62 respectively. The base 42*b* of amplifier 42 is connected to the collector of transistor 46 serially via capacitor 64 and resistor 66 and is biased by the B+ supply through resistor 68. The collector 42*c* of transistor 42 is biased from B+ supply through resistor 70. In operation the frequency of the output signal, which appears as almost a pure sine wave across the collector 42*c* of transistor 42 and the emitter 42*e* which is connected to ground or B−, is determined solely by the value of the capacitance 30**.

The frequency range of operation is not critical but should be as high as practical to obtain higher accuracy readouts. Units to date have been constructed to operate in the range of 0.8 to $1.2 \times 10^6 H_z$. With the unit operating at 800 K $H_z$ a change of the B+ supply from 6 to 12 volts resulted in a change of only 80 $H_z$.

Figure 3:
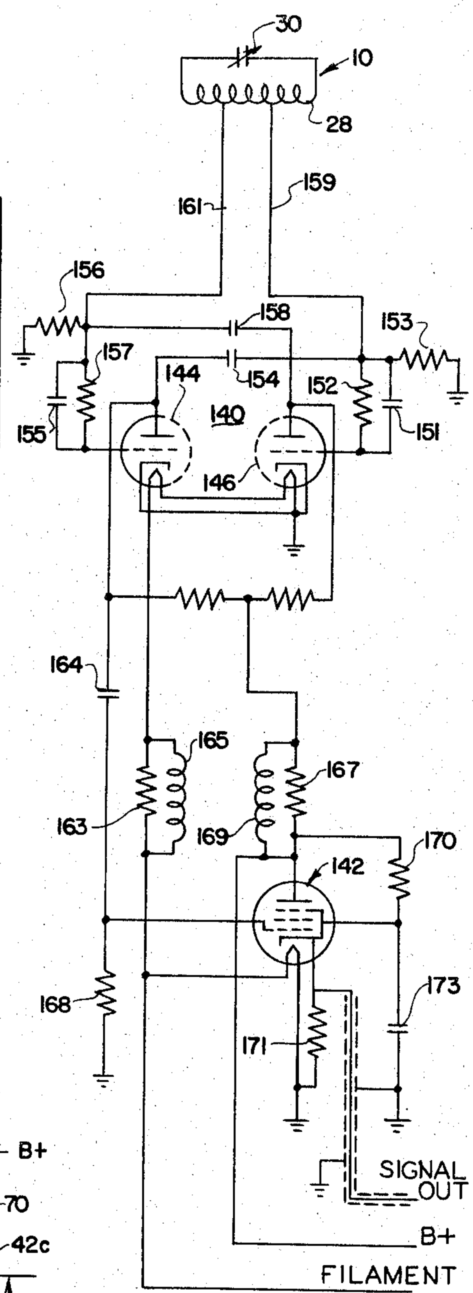
FIGURE 3 is a circuit diagram, using tubes, suitable for use with a transducer according to the invention.

Referring now to FIGURE 3, there is illustrated a tube version of the transducer circuit according to the invention. In a similar manner the circuit is seen to comprise a balanced push-pull oscillator 140 and an amplifier 142. The oscillator sections are shown as triodes 144 and 146 which may be enclosed in one envelope as a duo-triode. The cathodes are grounded and the plate of triode 144 is cross-coupled to the grid of triode 146 via capacitor 154 and resistor 152. The plate of triode 146 is cross-coupled to the grid of triode 144 via capacitor 158 and resistor 156. Capacitor 151 and resistor 153 provide by-pass functions for triode 146 as do capacitor 155 and resistor 157 for triode 144. The LC circuit consisting of inductance 28 and variable capacitance 30 is connected into triode 144 of the oscillator at the junction of the capacitor 154 and the resistor 152 and into triode 146 at the junction of the capacitor 158 and the resistor 157 via conductors 159 and 161 respectively. It will be noted that only a part of the central portion of the inductance 28 is included into the coupling which is very light.

The amplifier 142 is shown as a pentode with the output from the oscillator being coupled to the grid thereof via capacitor 164. The grid is biased by resistor 168 with respect to ground. The cathode is biased by resistor 171 with respect to ground and the output signal developed between the cathode and ground. The filaments of the tubes 144, 146 and 142 are supplied with suitable filament voltage with decoupling being provided between stages by resistance 163 and inductance 165 in parallel. B+ voltages are supplied from a suitable power supply, not shown, to the plates of triodes 144 and 146 via resistors 160 and 162. B+ voltage is fed direct to the plate of pentode 142 and to the screen electrode through resistor with the screen being by-passed by capacitor 173. The B+ supply of the stages is decoupled by resistor 167 and inductance 169 in parallel.

Pressure transducer systems according to the present invention have been constructed to provide pressure ranges from 0–1 inch of mercury up to 0–40 inches of mercury providing a resolution of approximately 1 part in 200,000. While applicant has shown what at present are considered to be the preferred embodiments of this invention, it will be obvious to those skilled in the art that various changes and modifications may be made therein without departing from the invention. It is aimed therefore in the appended claims to cover all such changes and modifications which fall within the true spirit and scope of the invention.

Referring now to FIGURES 4, 5 and 6, there is shown a mechanical motion comparator utilizing the present invention. The device is shown supported by a flat table 76 as is also an object 78 to be measured and compared. The capacitor device 30 comprises a fixed plate **30*a* and a movable plate 30*b*. Plates 30*a* and 30*b* are of gold-plated fused quartz which are fused to supporting members 80 and 82 also of fused quartz. Member 80 is connected to the center portion 84 of an inverted U-shaped support having vertical legs 86 and 88 supported by feet 90 and 92 resting on table 76 or other flat surface. Supporting member 82 is mounted for pivotal movement by means of quartz torsion fibers 94 and 96 attached at one end to member 82 and at the other end to vertical legs 86 and 88. The end of member 82 opposite the plate 30*b* is provided with a thumb set screw 98** threadably received therein.

The capacitance 30 of the comparator is connected into a circuit like that of FIGURES 2 and 3 and the thumb screw 98 is adjusted while resting upon an object 78 to be compared to provide a specified readout signal from the circuit. Objects 78 which have the same dimensions as the standard will provide the same readout signal and limits may be established for tolerances above and below which are acceptable.

Referring now to FIGURE 7, there is shown a device very similar to that of FIGURES 4, 5 and 6. The same parts are identified by the same reference numerals except for the provision of a scale pan 100 attached by suitable strings or wires 102 to the end of member 82 opposite the plate **30*b*. A known weight or standard weight 104 may be used to calibrate the scale, which when the capacitance 30 is connected into a circuit like FIGURES 2 and 3 will produce an output signal of a particular value. By calibrating the scale at a number of points with weights 104** of different values, it is possible to weigh an unknown.

Referring now to FIGURE 8, there is shown a temperature measuring device utilizing the present invention. The capacitor device 30 comprises a fixed plate **30*a* and a movable plate 30*b*. Plates 30*a* and 30*b* are of gold-plated fused quartz which are fused to supporting members 106 and 108. Member 106 is also of fused quartz connected to an upright 110 also of fused quartz and is in turn fused to a base member 112 also of fused quartz. The support member 108 is made of a high temperature coefficient material and is connected to base 112 in a suitable manner. The capacitance 30** is connected into a circuit like FIGURES 2 and 3 and the output signal therefrom is a function of the temperature to which the device is exposed. By exposing the device to known temperatures, it may be properly calibrated.

It will be obvious to those skilled in the art for example, that any measurement such as temperature, mechanical displacement, weight, etc. that can be translated into a mechanical displacement can be measured with this device.

What is claimed is:

1. A motion sensitive transducer system comprising in combination, a balanced push-pull oscillator having two sections including a control electrode and an output electrode connected in cross-coupled configuration with the control electrode of one section being connected to the output electrode of the other section and a variable LC motion responsive transducer means connected between said control and said output electrodes, and wherein the cross-coupling includes therein a part of the central portion of the inductance forming the transducer means, wherein the capacitor of the transducer means comprises a fixed capacitor plate supported on fused quartz mounts and a movable capacitor plate supported in spaced parallel relation to the fixed plate on movable pressure-responsive bellows constructed of fused quartz and the inductance of the transducer means is supported on a fused quartz coil form.

2. The transducer system according to claim 1 wherein light coupling is provided between the oscillating circuit and the driving amplifier and the oscillator output is a nearly pure sine wave.

3. The transducer system according to claim 1 wherein the LC motion responsive transducer means comprises an inductance coil and a pair of capacitor plates with a fused quartz form supporting the inductance coil in substantially concentric relation to the pair of capacitor plates, one of which plates is supported in fixed relation by a plurality of fused quartz arms which are supported in turn on a fused quartz tube terminating at one end in a movable pressure sensitive bellows having mounted thereon a movable capacitor plate in spaced parallel relation to the fixed plate with the interior and exterior of the quartz tube being connected to a pressure differential to be measured.

4. The system of claim 3 wherein the oscillator circuit includes a pair of transistors in grounded emitter configuration with the base electrodes thereof are connected to a bias voltage through a centertap connection to said central portion of the inductance and the collector electrode thereof connected to a power source.

5. The system according to claim 1 wherein the capacitor of the transducer means comprises a fixed capacitor plate supported on fused quartz mounts and a movable capacitor plate supported in spaced parallel relation thereto on a mounting adapted to permit movement of said plate in response to a parameter to be measured.

6. The system according to claim 5 wherein the mounting means comprises an arm supported on quartz torsion fibers and biasing the movable plate into a predetermined spaced relation with respect to the fixed plate.

7. The system according to claim 5 wherein the mounting means includes a high temperature coefficient support adapted to move said movable plate toward and away from the fixed plate as a function of temperature.

References Cited

UNITED STATES PATENTS

| | | | |
|---|---|---|---|
| 2,102,419 | 12/1937 | Klutke | 331—168 |
| 2,442,138 | 5/1948 | Mann et al. | 331—65 |
| 2,519,481 | 8/1950 | Kubie et al. | 331—168 |
| 2,698,386 | 12/1954 | Eberhard et al. | 331—114 |
| 3,111,848 | 11/1963 | Cornelison | 73—418 |

FOREIGN PATENTS

| | | |
|---|---|---|
| 1,135,034 | 4/1957 | France. |

NATHAN KAUFMAN, *Acting Primary Examiner.*

JOHN KOMINSKI, ROY LAKE, *Examiners.*